BEST AVAILABLE COPY
F. NEWBAUER.
GRAIN SHOCKER.
APPLICATION FILED JULY 29, 1916.
1,299,599.
Patented Apr. 8, 1919.
8 SHEETS—SHEET 1.
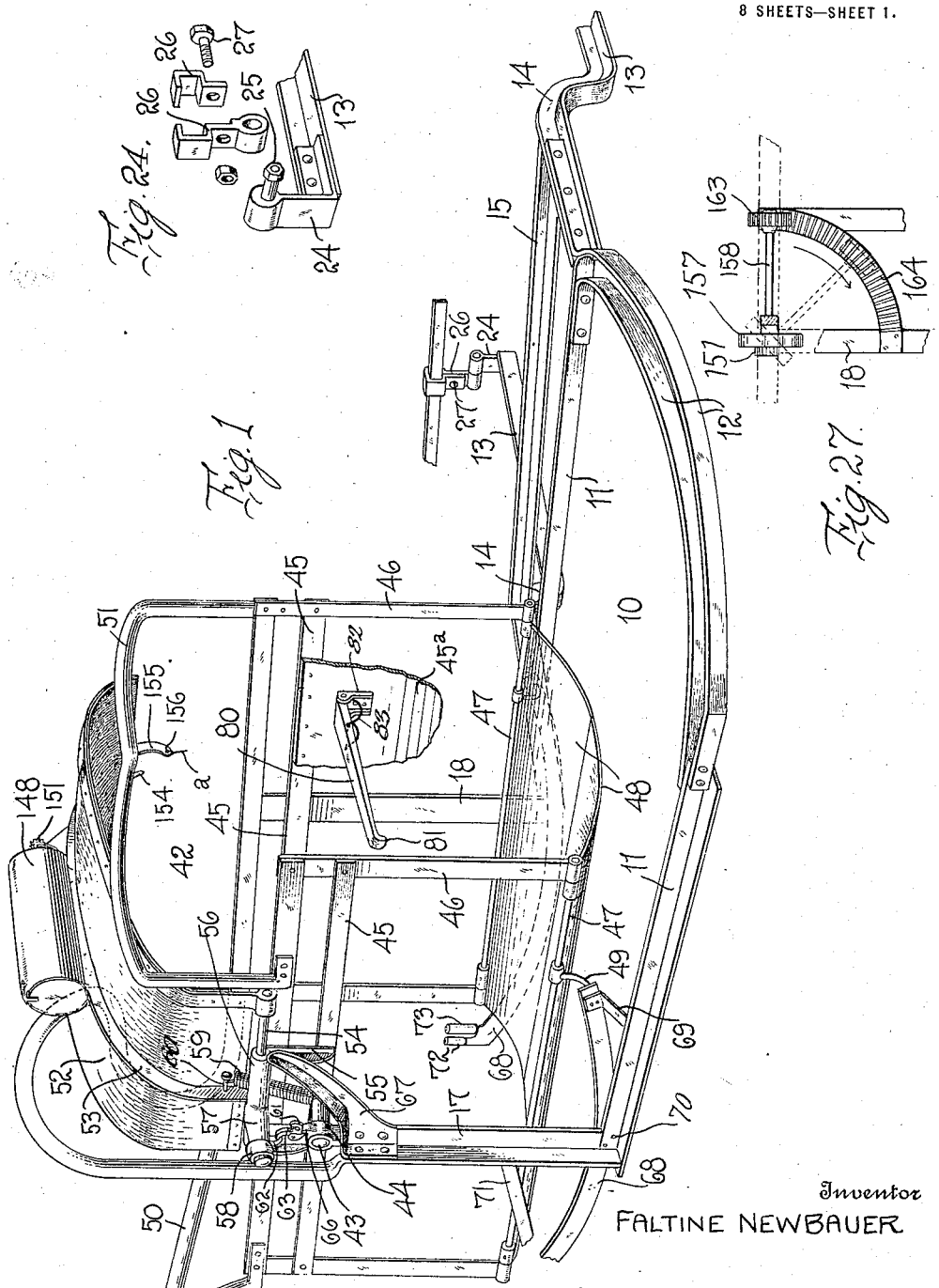
Inventor
FALTINE NEWBAUER
By Watson E. Coleman
Attorney

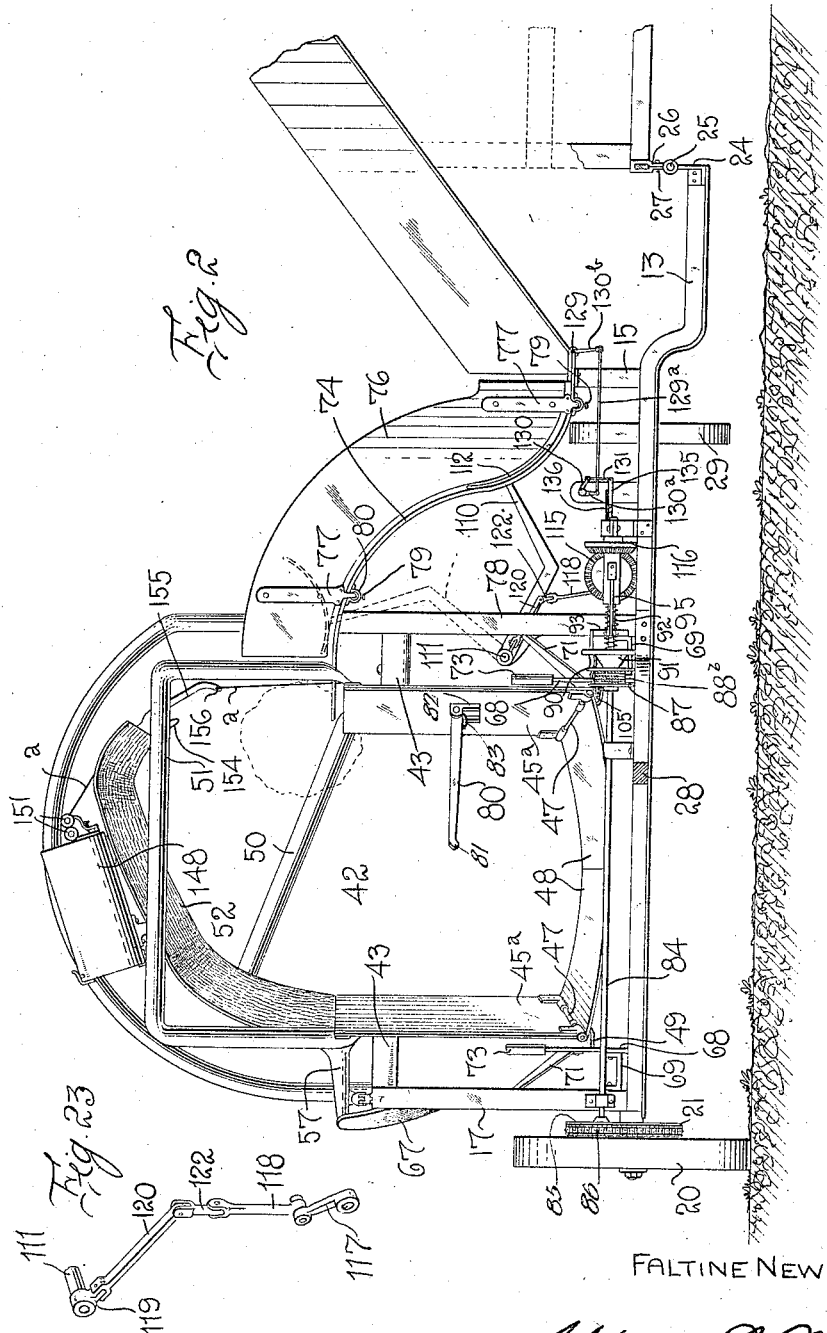

F. NEWBAUER.
GRAIN SHOCKER.
APPLICATION FILED JULY 29, 1916.
1,299,599.
Patented Apr. 8, 1919.
8 SHEETS—SHEET 3.
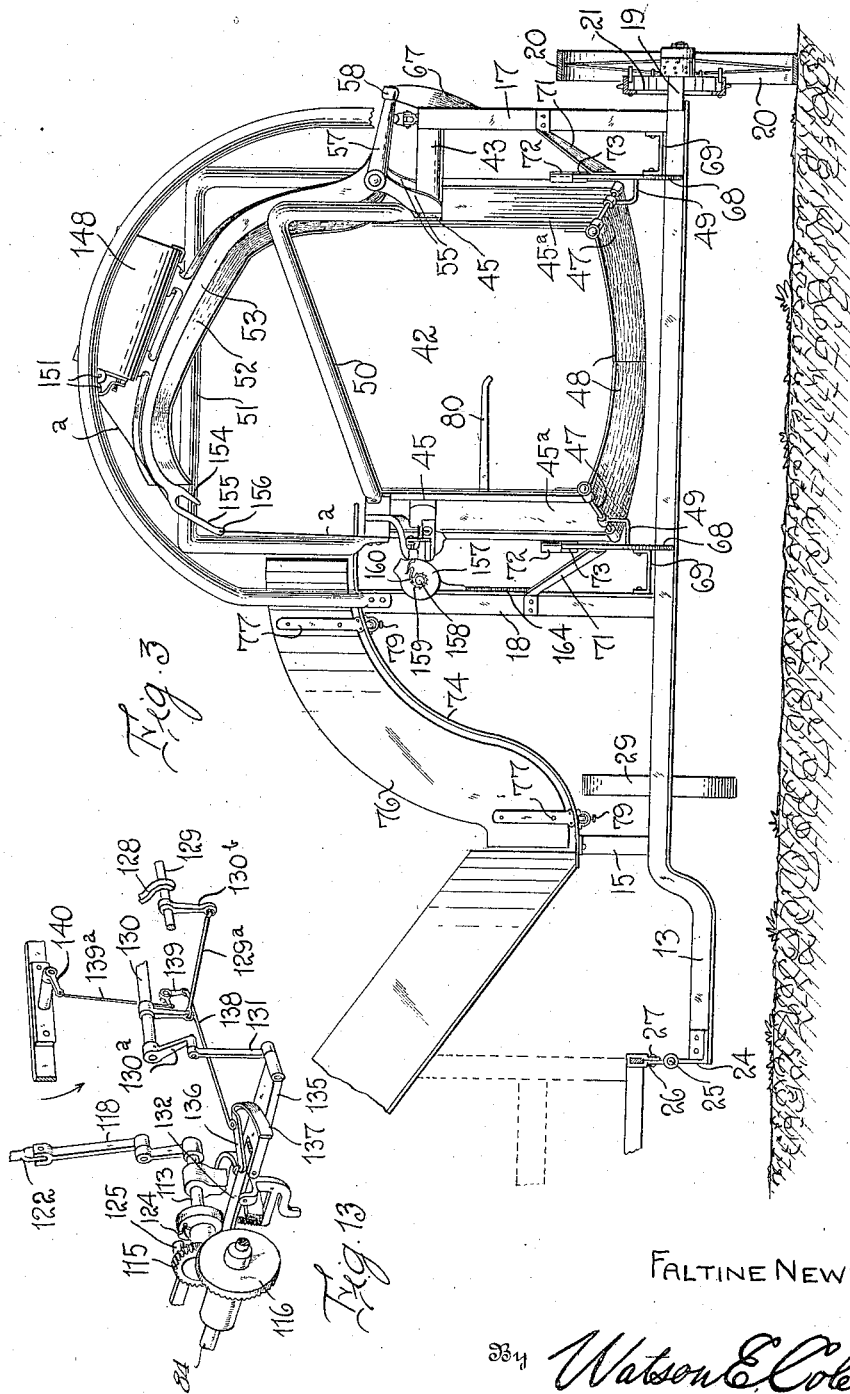
Inventor
FALTINE NEWBAUER
By Watson E. Coleman
Attorney

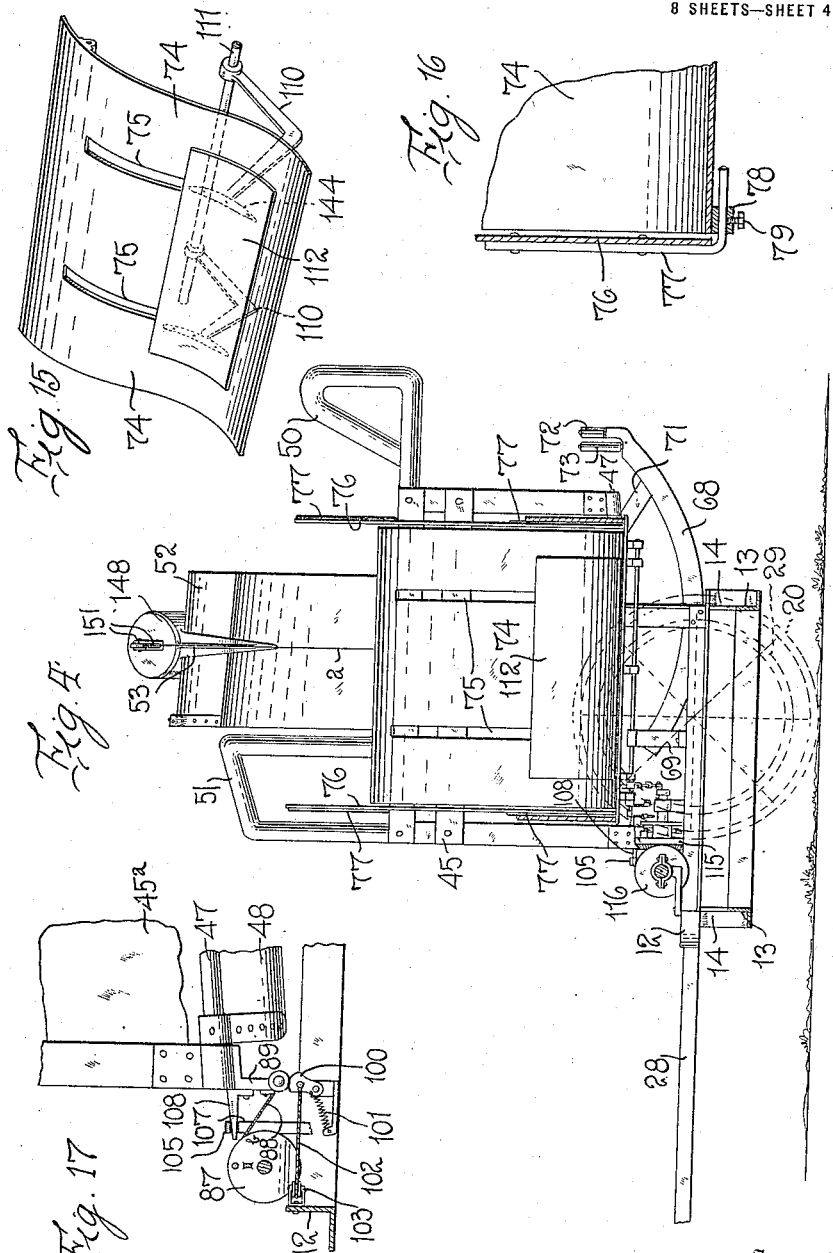

F. NEWBAUER.
GRAIN SHOCKER.
APPLICATION FILED JULY 29, 1916.
1,299,599.
Patented Apr. 8, 1919.
8 SHEETS—SHEET 5.
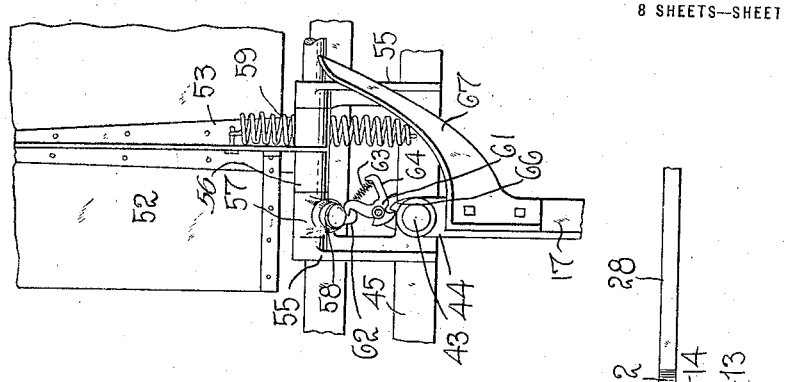
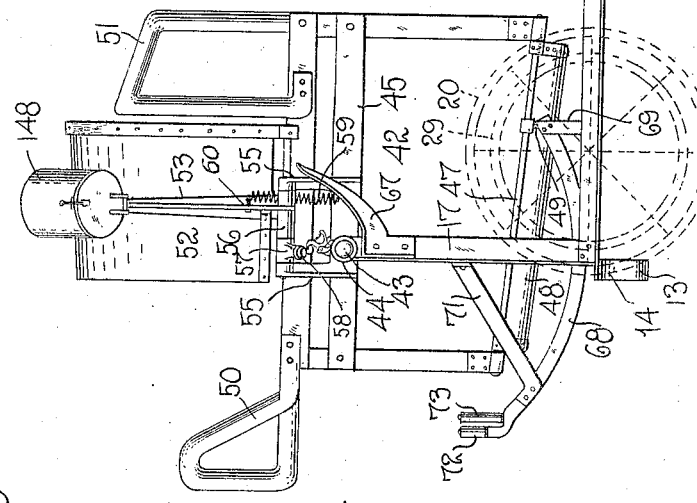
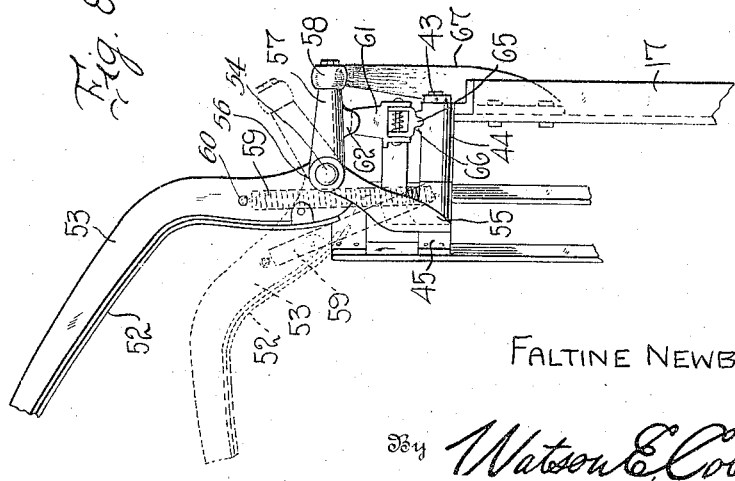
Inventor
FALTINE NEWBAUER
By Watson E. Coleman
Attorney

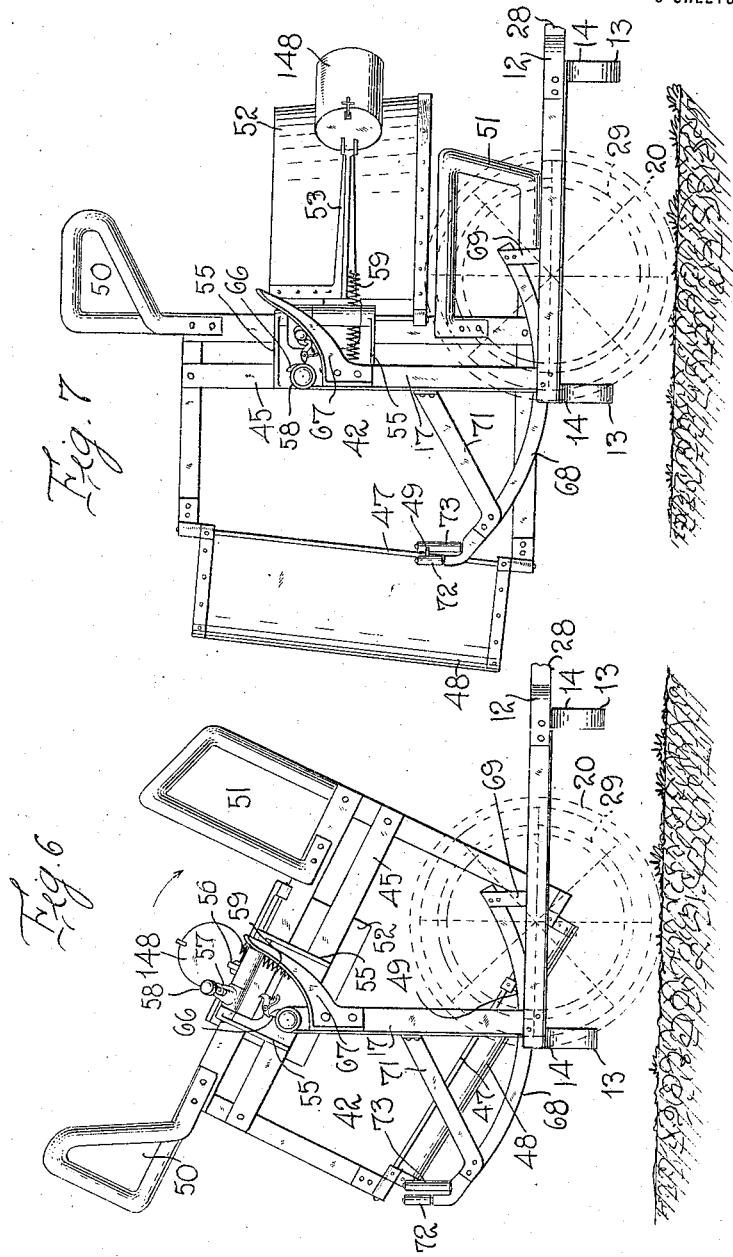

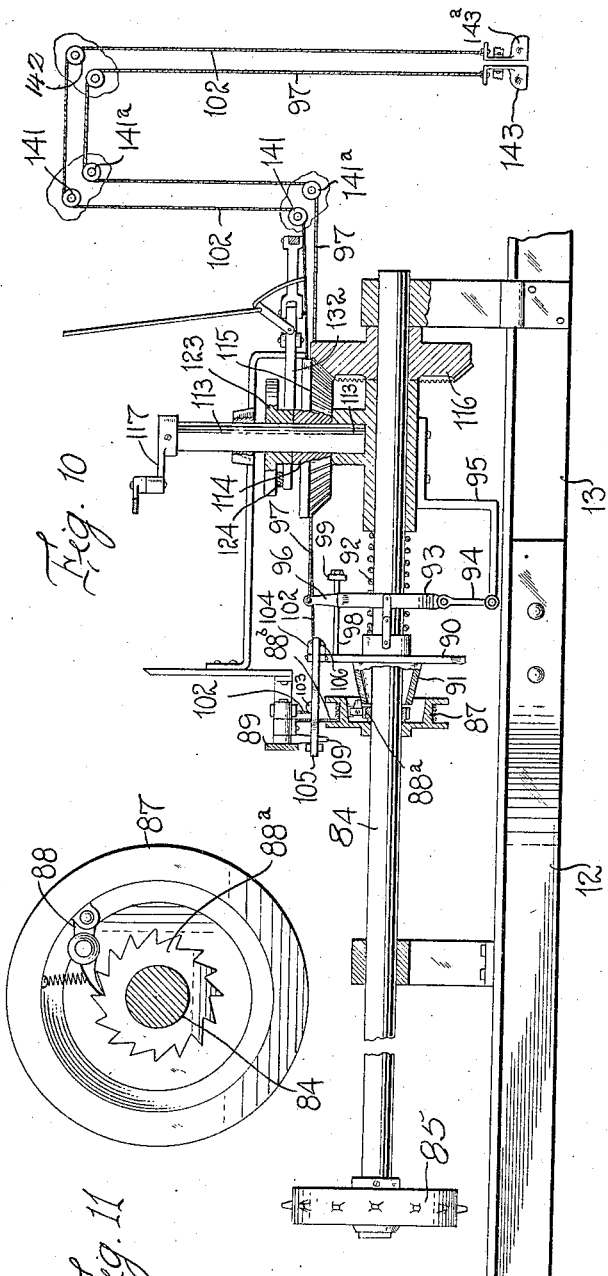

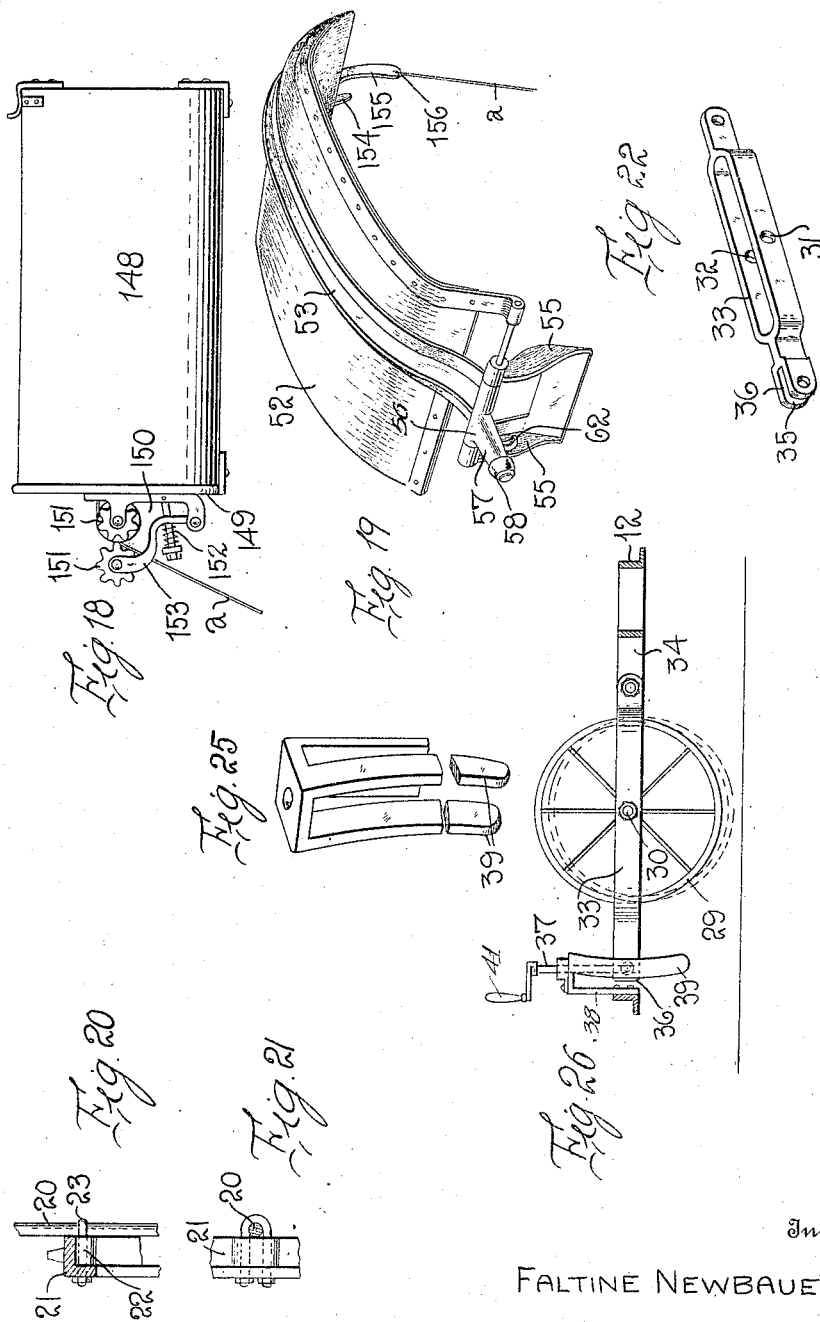

UNITED STATES PATENT OFFICE.

FALTINE NEWBAUER, OF VALLEY CITY, NORTH DAKOTA, ASSIGNOR OF ONE-EIGHTH TO CHARLES J. LEE, THREE-EIGHTHS TO EUGENE B. STULL, AND ONE-EIGHTH TO JOHN HOILAND, ALL OF VALLEY CITY, NORTH DAKOTA.

GRAIN-SHOCKER.

1,299,599.

Specification of Letters Patent. Patented Apr. 8, 1919.

Application filed July 29, 1916. Serial No. 112,115.

*To all whom it may concern:*

Be it known that I, FALTINE NEWBAUER, a citizen of the United States, residing at Valley City, in the county of Barnes and State of North Dakota, have invented certain new and useful Improvements in Grain-Shockers, of which the following is a specification, reference being had to the accompanying drawings.

My invention relates to harvesting machinery, and particularly to machines for shocking sheaves of grain.

The general object of my invention is to provide a shocker which may be readily connected to and driven with an ordinary binder or other like harvester and into which the sheaves from the binder may be deposited one by one and when a suitable number of sheaves have been so deposited to form a shock, to provide means for depositing this shock in an upright position upon the ground. This, of course, is the general object of all grain shocking devices.

Among the more specific objects of my invention is to simplify machines of this type, reduce their number of parts, increase the ease and directness of operation, and provide for the automatic action of the machinery in so far as possible.

A further object of the invention is the provision of a machine of this kind in which the shock is tied or bound by a binding cord so that the shock will not fall apart when deposited upon the ground.

A further object of the invention is to provide means actuated by the operation of a suitable element whereby the shock former may be released from a horizontal position and will automatically swing to a vertical or depositing position and automatically open to permit the discharge of the shock, and means operated by an actuation of a second element whereby the tractive power of the machine may be used for turning the shock former back to its receiving position.

Still another object of the invention is to provide very simple means for holding the shock former open when it is in its receiving position and closing the shock former as soon as it starts to rotate to a vertical discharging position, and means operated just before the former reaches its discharging position for operatively opening the doors or gates of the shock former to permit the shock to pass out.

A still further object of the invention is to provide in connection with the grain or sheaf chute and packer arms operating in connection therewith to shift the grain along the chute, of means operated by the deposition of a sheaf upon the chute acting to operatively connect the packer arms with the traction wheel of the machine so as to cause said packer arms to act, and in this connection provide means for stopping the actuation of the packer arms after a sheaf has been deposited within the former until the next sheaf has operated upon said starting means.

Still another object in this connection is to provide means for preventing the operation of this packer mechanism when the shock former is moving from its receiving to its discharging position, and until the shock former has returned to its receiving position, and in this connection to provide means for driving the packer arms by power transmitted through the drive wheels of the machine, means for operatively connecting the traction wheel to the packer arms upon the deposition of a sheaf in a position to be acted upon by the packer arms, and means for preventing this operative connection between the traction wheel and the packer arms even though a sheaf be deposited in position to be acted upon by the packer arms if the shock former has rotated to its discharge position or is not in a receiving position.

Still another object of the invention is to provide a shock former comprising a cradle-like body having doors or gates forming the bottom of the body or cradle, and provide a section which is shiftable toward the bottom to compress the sheaves within the former while it is rotating from a receiving position to a discharge position, and provide means for opening the doors or gates when the former has shifted to its discharge position.

Other more specific objects will appear in the course of the following description.

My invention is illustrated in the accompanying drawings, wherein:

Figure 1 is a perspective view of the frame of the shocker and of the frame of the shock former;

Fig. 2 is a rear elevation of the shocker, showing it attached to a binder;

Fig. 3 is a front elevation of the shocker showing it attached to a binder;

Fig. 4 is a side elevation of the shocker in a shock receiving position looking toward the apron;

Fig. 5 is a side elevation of the shocker from the opposite side to that shown in Fig. 4;

Fig. 6 is a side elevation of the shocker like Fig. 5 but showing it rotating from its receiving to its discharging position;

Fig. 7 is a like view to Fig. 6 showing the shock former in its discharging position;

Fig. 8 is a fragmentary elevation of the needle arm and means whereby the needle arm is elevated and depressed;

Fig. 9 is an end elevation of the needle arm, the shield and the mechanism illustrated in Fig. 8;

Fig. 10 is a top plan view of the mechanism for controlling the return of the shock former to its receiving position and the mechanism for automatically disconnecting the packer arms from the power shaft;

Fig. 11 is an end elevation of the winding drum, the shaft being shown in section;

Fig. 12 is a side elevation of the clutch;

Fig. 13 is a perspective view of the mechanism for operating the bundle carrier and controlling the movements thereof.

Fig. 14 is an elevation of the latch 105 and allied parts;

Fig. 15 is a perspective view of the apron with the bundle carrier mounted thereon;

Fig. 16 is a sectional view through one end of the chute or apron having the butt plate 76 and its means of adjustment;

Fig. 17 is a fragmentary end elevation of the forward end of the shock former, the winding drum and the means whereby the shock former is sustained in a horizontal position;

Fig. 18 is an elevation of the twine box and tensioning mechanism;

Fig. 19 is a perspective view of the needle arm and the shield;

Fig. 20 is a fragmentary sectional view showing the manner in which the sprocket wheel 21 is connected to the traction wheel 20;

Fig. 21 is a top plan view of the construction shown in Fig. 20;

Fig. 22 is a perspective view of the means for raising or lowering the wheel;

Fig. 23 is a fragmentary view showing the links connecting the rock shaft 111 with the crank shaft 113; and Fig. 24 is a perspective view of the clamp connecting the frame of the shocker to the frame of the binder.

Fig. 25 is a perspective view of the guide 39;

Fig. 26 is a side elevation of the frame for supporting the small wheel 29 and the means for raising or lowering this wheel;

Fig. 27 is a side elevation of the means for actuating the knotter, the view looking from the inside face of the rack 164.

Referring to Figs. 1 to 5, it will be seen that the basic support of the shock former comprises a frame designated generally 10, this frame consisting of the parallel bars 11 which are of flat iron or angle iron, these bars being operatively connected to each other by cross bars 12. To this frame are attached the laterally extending bars 13, bent downwardly at 14. The bars 13 are operatively connected by braces at any suitable points, and as illustrated there is a connecting bar or brace 15 at the bend 14. The frame 10 at one end is provided with the upstanding portion or standard 17 and the opposite side of the frame is formed with the standard 18, these standards acting as pivotal supports for a cradle or shock former as will be later described. Mounted for vertical adjustment on one side of the frame 10 is a stub shaft 19 upon which is rotatably mounted a traction wheel 20, this traction wheel carrying a relatively large sprocket wheel 21. This wheel 21 is formed at intervals with laterally projecting lugs 22 through which U-bolts 23 pass, these U-bolts embracing the spokes of the traction wheel and holding the annulus in position thereon.

The shocker is attached to the binder by means of the hinged clips as illustrated in Fig. 24. To this end there is bolted to the extremities of the transverse bars 13 the angular members 24 which at their upper ends are formed with eyes through which a pintle bolt 25 passes, and pivotally connected to this pintle bolt are the oppositely disposed clamping jaws 26 which are urged into clamping relation by means of a bolt 27. The pivoted clamping members or clips thus formed are adapted to be readily connected to the frame of any make of binder and the hinged connection so formed permits the movement of the binder and shocker over uneven ground and of course permits a relative movement of the two machines. The frame 10 is also provided with the outwardly extending tongue 28 which is braced from the frame 10. This tongue or brace is for the purpose of holding the shocker and the harvester and the binder in proper relation when the two machines are hingedly connected together and ready for operation in the field. This tongue is used as a draft tongue for the attachment of draft animals when the machine is to be transferred from field to field and independent of the harvester or binder.

Mounted upon the frame 10, opposite the traction wheel 20 is a small supporting wheel 29 which is mounted upon an axle 30 and in turn mounted in bearings 31 and 32 formed on the yoke 33. This yoke is pivotally mounted on a bracket 34 and its free end is engaged by a sleeve 35 pivoted to forks 36. This sleeve is swiveled to a screw 37 which passes loosely through a bracket 38 and the screw 37 is provided with a crank 41. This wheel 29 may be used when the machine is disconnected from the harvester or binder to permit the machine to be transferred from place to place.

Swingingly mounted between the standards 17 and 18 is the shock former which is designated generally 42. This shock former is mounted on trunnions 43 in turn mounted in suitable bearing brackets 44 carried by the standards 17 and 18.

By reference to Fig. 1, it will be seen that the shock former comprises oppositely disposed side frames, each frame comprising a longitudinally extending bar 45 from which the trunnions 43 project, these bars 45 at their ends being connected to vertical bars 46. These side frames formed by the bars 45 and 46 are disposed in rearwardly extending convergent relation to each other. The forward vertical bars 46 are longer than the rear vertical bars 46 and operatively supported upon the lower ends of the bars 46 are the pintle members 47 to which the doors 48 are operatively connected, these doors 48 forming the bottom of the cradle or shock former when the shock former is in its horizontal position. The pintles 47 practically form rock shafts and the doors 48 are rigidly connected each to its respective rock shaft so that when the shafts are rocked in one direction the doors will open and when the shafts are rocked in the opposite direction the doors will close. Each of these shafts is provided at one point in its length with a downwardly and outwardly curved finger 49 which is rigidly connected to the shaft and which forms the means whereby the shaft is rocked in a manner which will be later described. At its rear or smaller end, the side frames of the shock former are connected by means of a transversely extending bar or pipe 50 which, as shown, extends upwardly and rearwardly from one of the bars 45, then is curved and laterally extended and connected to the rear end of the other bar 45. The forward ends of the side frames of the shock former are connected by a transversely extending pipe 51 which is bent as illustrated in the drawing for a purpose to be later stated. These members 50 and 51 rigidly connect the side frames so as to hold them in proper spaced relation.

The shock is compressed by a somewhat arcuate shield 52 which is attached to a somewhat arcuately curved needle bar 53, this needle bar at one end being curved and pivotally mounted upon a shaft 54 in turn mounted upon a bracket 55 extending upward from the bar 45. As illustrated, this bracket is somewhat U-shaped in form and carries bearings for the shaft or pivot 54, and rigidly mounted upon the shaft 54 is a sleeve 56 from which extends the needle arm 52. This sleeve 56 has projecting from it the laterally extending arm 57 which carries at its extremity the roller 58. The arm 53 is urged into a lowered position by means of the coiled spring 59 which is connected at its lower end to the base bar of the bracket 55 and which at its upper end is connected to an eye 60 formed upon the arm 53. This coiled spring being flexible, permits the needle arm and shield to move upward into the position shown in full lines in Fig. 8, but causes the arm to move downward to the position shown in dotted lines in Fig. 8 upon the release of the needle arm in the manner hereafter stated. The shield 52 is preferably formed of sheet metal and as illustrated in Fig. 5 only extends for a portion of the length of the cradle or shock former. The forward edge of the shield is disposed just rearward of the connecting bar or pipe 51. Mounted upon the needle arm is the twine holder and the tensioning mechanism which will be later described. The exact forms of the free end of the needle arm will be later stated also.

As before stated, the shock former is disposed normally in a horizontal or receiving position. When it has been properly loaded with sheaves of grain by the mechanism which will be later described, the shock former is released and turns to a vertical position and the needle arm 53 with the shield 52 is turned down into the position shown in dotted lines to compress the sheaves. The mechanism for rotating the shock former from its receiving to its vertical position will be later stated but the mechanism whereby the needle arm and shield are turned downward or toward the doors 28 while the former is moving to a discharging position and then returned to its normal open position before the shock former reaches its discharging position is as follows: Mounted upon the bracket 55 is a spring actuated latch 61 which has a hook-shaped terminal end or detent which is adapted to engage with a hook-shaped keeper 62 which is carried upon the arm 57 inward of the roller 58. This latch is urged into an approximately vertical position by means of a spring 63 mounted upon the extremity of an arm 64. Carried upon the pivot bolt or pin of the latch 61 is a bifurcated member 65 which fits between the bifurcated arms at the base of the latch 61 and which is adapted when turned in one direction to engage with the latch 61 to rotate it out of its engagement with the hook 62 but to rotate freely and independently in the other direction. Mounted rigidly upon the bearing for the trunnion 43 is a ratchet lug 66 or tooth with which the extremity of the member 65 engages. Normally the latch 61 engages the hook 62 and thereby holds the adjacent end of the needle bar 53 downward so that the free end of the needle bar is raised to the position shown in full lines in Fig. 8.

Mounted upon the standard 17 is a forwardly and upwardly projecting arm 67 whose inner face forms a cam track engageable by the roller 58. Now when the shock former is released by the mechanism later described it will rotate in the direction of the arrow, Fig. 6, and the extremity of the member 65 will be engaged with the ratchet lug 66 and trip the latch 61, releasing the hook 62, thus releasing the needle bar 53 and the shield 52 and permitting them to drop into a sheaf compressing and tying position, that is, in the position shown in dotted lines in Fig. 8. The spiral spring 59 holds the arm 53 in this position until the roller 58 comes in contact with the cam face of the arm 67 which, as before stated, is stationary on the standard 17. This cam face causes the lever, as the shock former turns from an inclined position into a vertical position, to move against the force of the spring 59 into the full line position shown in Fig. 8 and eventually brings the rock shaft 54 into such position that the hook 62 will again engage with the latch 61. Thus when the shock former has reached a vertical position the shield 52 will be open and exert no compression upon the shocks The former will return from its discharging position to its receiving position with the shield and needle bar in their raised or open positions. It will be seen that this operation of closing the shield upon the shock and then opening the shield is all done while the shock former is turning to a discharging position by gravity due to its own weight and the weight of the shock inclosed.

It is necessary when the shock former has turned to its vertical position that the doors or gates 48 shall be opened so as to permit the shock to be discharged as the machine moves forward. To this end, as before stated, each of the shafts 47 upon which the gates 48 are mounted, is provided with the outwardly and downwardly curved fingers 49. Coacting with each finger is an elongated arcuate stop 68 which is formed of a bar of metal disposed in a vertical plane and bowed downward. The forward end of each stop bar 68 is supported by means of a bracket 69 and this forward end is so disposed that it will engage with the end of the corresponding finger 49 and prevent this finger from rotating and thus hold the corresponding gate 48 in its closed position.

Each arcuate stop bar 68 is disposed concentric to the axis 43 upon which the shock former turns. The middle of each stop bar is bolted as at 70 to the bar 11 of the base frame, the bracket 69 being attached to the same bar, and the rear end of each stop bar 68 is supported by means of a brace 71 attached to the corresponding standard 17 or 18 and extending rearward and downward. The extremity of each stop bar is formed with bearings for vertically disposed cam rollers 72 and 73 between which the finger 49 is adapted to operate. Now upon the rearward movement of the fingers 49 due to the turning movement of the shock former from a receiving to a discharging position, the extremities of the fingers travel along the stop bar 68 and hence the doors are held closed, but when the extremities of the fingers pass between the rollers 72 and 73 the fingers are forced inward by the camming action of these rollers and as a consequence the doors 48 are positively opened, permitting the discharge of the shock. Upon the return movement of the shock former from its discharging to its receiving position, these camming rollers 72 and 73 again act to cause the closing of the gates by engaging with the fingers 49 and the ends of these fingers striking the stop bar 68. The gates are held closed while the former returns to its horizontal or receiving position. It will thus be seen that these gates or doors are not opened until the former has reached its vertical position and that then they are opened to their full extent to permit the shock to pass out of the gates.

Operatively supported upon the base frame in any suitable or well known manner is a bundle or sheaf chute or apron designated generally 74. This chute has its lower edge disposed approximately above the cross bar 15 and is supported on uprights 78 or braces bolted to the bars 11 and by braces attached to the standard 18. The chute extends inward, upward, and again inward over the side bar 45. This chute is preferably of sheet metal, is slotted as at 75, and receives the bundles from the binder, and by mechanism which will be hereafter described, these bundles are carried up the chute and discharged into the shock former proper. Disposed in connection with the front end of the chute is a front bundle guide 76. This is made of stiff sheet iron and is riveted to a pair of L-shaped members 77 which are slidably supported in sleeves 80, these sleeves each being formed with a base bolted or otherwise secured to the sheet metal chute 74. Set screws 79 are provided to hold the front bundle guide in its adjusted position. (See Fig. 21.)

In order to provide means for catching the first bundle and holding this bundle in a level position until the next bundle is in place, I provide a finger 80 which is bifurcated at its inner end and slightly bent downward at its outer end as at 81. This finger 80 is pivotally supported in a bracket 82 mounted upon the sheet metal web 45ª. This finger is provided with a spring 83 to hold the finger in a horizontal position in order to catch the first bundle and to hold it in this horizontal position until the second bundle is in place. When the second bundle has been deposited upon this finger 80 the weight of the bundles causes the finger to turn downward along the side of the former and stay in this position until the shock is deposited on the ground. When the shock is so deposited and has cleared the former, the spring throws the finger again into catching position ready for the next shock. The purpose of this finger is to hold the first two bundles from sliding out of place and to let down the bundles gradually in front as at the back they are held by the twine passing from the twine box to the extremity of the needle arm and to the knotter, as will be later described.

The mechanism whereby the shock former is shifted from its receiving or horizontal position to its vertical or discharging position is as follows: Extending across the forward end of the supporting frame and mounted in suitable bearings is a shaft 84. This shaft carries upon one end the sprocket wheel 85 which is connected to the sprocket wheel 21 by means of the sprocket chain 86. Mounted upon the shaft 84 in approximate alinement with that side of the shock former adjacent the chute 74 is a winding drum 87 which is loose upon the shaft 84 and which is provided upon its inner face with a hingedly mounted pawl 88, there being a spring to throw the free end of this pawl inward and into engagement with the ratchet wheel 88ª and the shaft 84. Carried upon the drum 87 is a cable 88ᵇ which is operatively connected to a downwardly extending standard 89 mounted upon the forward end of the shock former. (See Fig. 17.) Slidably mounted upon the shaft 84 at the open end of the drum 87 is a disk 90 having a cone 91 which extends into the hollow winding drum and which, when the disk is forced against the end of the drum, raises the pawl 88 out of its engagement with the ratchet teeth 89 as illustrated clearly in Fig. 10. This disk is urged into this position by means of a spring 92 whose rear end bears against a collar or other suitable abutment mounted upon the shaft 84 or in any other suitable manner, and for the purpose of forcing this disk 90 laterally outward so as to carry the cone-shaped annulus 91 out of engagement with the pawl 88, I provide a ring 93 which loosely surrounds the shaft 84 and which is pivotally supported on one side by means of a link 94 mounted upon a bracket 95. The other end of this ring 93 has an arm 96 which in turn is connected to a trip cord or cable 97 passing over suitable pulleys as will be later stated. When this trip cord or cable 97 is pulled it will act upon the lever 96 and draw the ring 93 outward against the force of the spring 92 and draw the disk 90 outward so as to permit the pawl 88 to engage with the ratchet teeth 88ª, in which case the winding drum has rotation with the shaft 84. When, however, this trip cord is released and the disk is permitted to move inward by mechanism to be later stated, the pawl will be disengaged from the ratchet 89 and the drum will not rotate. The disk 90 is provided with a laterally projecting guide rod 98 which moves in a suitable guide 99 extending upward from the frame of the machine.

For the purpose of supporting the shock former normally in a horizontal position the standard 89 upon the forward end of the shock former is disposed to rest upon a pivoted support 100 (see Fig. 17) which is pivotally mounted upon the frame of the machine, this standard being urged into a vertical position by a spring 101 or any other suitable means and being connected to a trip cord 102 which extends forward and over a suitable pulley 103 and then extends laterally and rearward and over suitable pulleys to an operating element on the binder. Now when this trip cord 102 is pulled it will throw the pivoted support 100 out of engagement with the standard 89 so that the forward end of the shock former, being unsupported, the shock former may rotate upon its trunnions to a vertical discharging position. The shock is discharged by the opening of the gate 48 as was heretofore described, and after this occurs it is necessary to return the shock former to its horizontal or receiving position. To this end the cable 97 is operated to draw the cone 91 out from its engagement with the pawl 88 so that the pawl engages with the rotating shaft 84 thus locking the drum to the shaft. The rotation of the shaft is now communicated to the drum and the drum winds up the cable 88 until the shock former is drawn to its horizontal position.

In order to release the drum from its engagement with the shaft 84 when the shock former has reached its horizontal position, I provide means for tripping the disk 90 so as to permit the spring 92 to force the disk inward. To this end the disk 90 carries a bracket 104. Upon this bracket there is pivoted a catch 105 which is held in operative position by means of a spring 106. A keeper 107 projects upward from the frame of the machine, the catch 105 having a lug 108 which engages with the keeper. Mounted upon the standard 89 is a finger 109, one end of which is adapted to engage beneath the catch 105. Now when the cable 97 is drawn upon to withdraw the cone 91 from its engagement with the pawl 88 this lug rides over the lug 108 and this holds the disk pressed laterally outward against the force of the spring 92. When, however, the shock former has nearly reached its horizontal position the finger 107 will strike the catch 105 and this will force the catch 105 out of engagement with the keeper 107 and the spring 92 then forces the member 91 into engagement with the pawl, raising the pawl from its engagement with the ratchet 89 and thus stopping the further movement of the drum.

For the purpose of carrying sheaves of grain over the chute 74 so as to deposit the sheaves within the shock former, I provide a pair of packer arms designated 110, mounted upon a shaft 111 which is mounted in suitable bearings supported in any suitable manner upon the frame of the machine. These packer arms are angular in form and carry a hinged, curved plate or head 112 whose construction will be later stated.

It is of course obvious that at proper times these packer arms should be rotated so as to engage a sheaf carried onto the apron 74 and deposit it within the shock former and then return to their original positions. To this end I provide a crank shaft 113 which is mounted in suitable bearings on the frame of the machine and this crank shaft carries upon it a sleeve 114 provided with a beveled gear wheel 115 meshing with a beveled gear wheel 116 on the shaft 84. Thus normally, though the sleeve 114 is constantly rotated the shaft 113 remains stationary. The shaft 113 at its extremity is formed with a crank 117 from which extends a link 118. (See Fig. 23.) The upper end of this link is bifurcated. Carried upon the adjacent extremity of the shaft 111 is a radially projecting lug 119 to which is pivoted a rod 120 forming the inner end of a crank arm, this crank arm in turn carrying a pivoted clevis 122 in turn pivoted to the bifurcated upper end of the link 118. These jointed connections between the link 118 and the crank shaft 111 are necessary in order to secure the freedom of movement required by the various motions given to the machine.

Mounted upon the crank shaft 113 is a clutch member 123 having a dog 124 pivoted upon its face, this dog being formed with a recess 125 which when the dog is projected is adapted to be engaged by a roller 126 mounted upon the gear wheel 115 and projecting out therefrom. If the catch 124 is projected by the spring 127 to the position shown in Fig. 12 this roller will engage with the recess 125 and inasmuch as the clutch member 123 is fixed to the crank shaft 113, rotary motion will be communicated to this crank shaft. The active end of the catch 124 is held in a retracted position by means of a member 132. When this member is in dotted line position in Fig. 12, the catch is retracted. When the member is in full line position, however, in this figure, the catch will be projected into position to lock with the roller 126.

For the purpose of automatically engaging the crank shaft 113 with the sleeve 114 each time that a sheaf of grain has been deposited on the apron in position to be engaged by the heads 112 of the packer arms, I use the usual binder arms 128 mounted upon a shaft 129. This shaft is connected by a link 129ª to a crank 130ª on shaft 130 and depending from this crank is a link 131. Pivotally supported upon the base frame of the machine is a latch 132 which is pivoted upon a member 133. The free end of this latch is adapted to engage the dog 124 and force the lower end of this latch outward when the latch member 132 is raised therefore carrying the member 124 out of engagement with the roller 125 on the gear wheel 115. The inner end of this member 132 is raised by means of a spring 134. The outer end of member 132 is twisted to a bifurcated link 135 which in certain circumstances forms a lever. This is connected by link 131 to the crank 130. Pivotally mounted upon member 132 is an L-shaped arm 136 having an angular extension 137 which normally extends across the link 135 and forms the fulcrum therefor. This L-shaped arm is hingedly connected to a lever 132 and by a link 138 to a bell crank 139, in turn connected by a link 159ª to a crank 140, rigidly mounted upon the shock former.

We will assume that a bundle or sheaf has been deposited upon the lower end of the bundle chute by the usual mechanism on the binder. The bundle presses against the binder trips 128, causing these trip arms to rotate and causing the rotation of the shaft 130. This rotation of the shaft causes the lifting of the link 131 and thus lifts the outer end of the member 135. This causes the depression of the opposite end of the member 132 from the position shown in dotted lines in Fig. 12 and thus permits the active end of the latch 132 to move into the path of movement of the roller 125 and motion is communicated from the clutch member 126 to the clutch member 123 and thus the shaft 113 is caused to revolve. This revolution of the shaft 113 causes the packer arms 110 to make a complete oscillation. The packer arms transfer the bundle over the bundle chute 74 into the shock former. As the twine passing from the extremity of the needle arm has to cross the inlet to the shock former the bundle draws the twine with it into the shock former. This being done the packer arms are now on their backward motion returning to their normal or lowered position.

Member 132 has a spring 134 beneath it and as soon as the bundle has passed the trip tongues 128 this spring raises up the member 132 to its normal position and this action throws the trip tongues 128 back to their proper position again. The spring 134 throws up the free end of the member 132 so that it is disposed in the path of movement of the member 124 and thus causes the recessed end of member 125 to be withdrawn from its engagement with the roller 126. The rotation of the gear wheel 115 therefore has no effect upon the shaft 113 and the shaft 111 comes to rest. This operation is repeated with each bundle until the shock former is full. When the shock former is tilted from its horizontal to its vertical position (as shown by arrow Fig. 13) the L-shaped member 136 is drawn away from its engagement with the link 135. Under these circumstances any rotation of the shaft 129 will not affect the member 132, and will therefore not cause the clutching of the shaft 113 to the sleeve 114.

Assuming that the shock former is full, the shock is now ready to be tied and deposited upon the ground.

Means are provided, as before described, for tripping the shock former so that it may rotate to its discharging position and means are also provided, as previously described, for causing the retraction of the shock former to its vertical position. These two means are actuated by the trip ropes 97 and 102 respectively. These trip ropes are operatively connected to certain pedals on the binder as will now be described.

The trip rope 102 (see Fig. 10) extends over grooved pulleys 141 mounted on the forward and rear ends of the bundle chute and then over a pulley 142 on the binder. The first trip rope, that is, the trip rope 102, is connected to the foot lever 143 which on single binders is used to operate the bundle carrier. When the binder is operated in connection with the shocker this bundle carrier connection is disconnected but is still left on the binder in case it is needed for use again. It will be understood that an operation of the foot lever 143 causes the dislocation of the pivoted standard which supports the forward end of the shock former so that the latter will swing to a vertical position as heretofore described. The second trip rope 97, which is designed to bring the shock former again to a receiving position, leads rearward from a foot lever 143ª on the binder and then extends from and across the rear lower end of the binder to the bundle chute frame and then leads over the pulleys 141ª. When the operator puts his foot on this foot lever 143ª he causes, through the operation of the mechanism heretofore described, the dog or pawl on the interior of the cable reel to engage with the ratchet teeth on the counter-shaft on which the reel is mounted so that this reel or drum rotates to draw the shock former back to its original position.

While I do not wish to be limited to the use of any particular form of packer heads mounted upon the packer arms 110, I preferably pivot to the forward end of each packer arm the packer head 144, to which the plate 112 is pivoted.

Mounted upon the needle bar 53 at its middle is a twine holder, designated 148. This twine box or holder is of the ordinary pattern, and mounted upon one of the hinged ends 149 of the twine box is a tensioning device 150 which comprises oppositely disposed intermeshing gears 151 between which the twine passes, one of said gears being forced against the other gear by means of a spring 152 engaging a pivoted or hinged support 153.

The extremity of the needle bar or arm 53 is bifurcated to provide two extensions 154 and 155. The extension 155 is considerably longer than the extension 154 and is offset from the plane of the end of the needle bar and is provided at its extremity with the perforations 156 through which the twine $a$ passes. The twine extends downward to a knotter which is of standard form and such as are used on certain classes of binders. Any suitable form of knotter may be used for the purpose, however. The knotter includes, however, a cam wheel 157 which is mounted for free rotation on a shaft 158, this shaft being supported on suitable bearings on a side frame of the shock former, these bearings being carried by suitable brackets. The shaft 158 carries upon it a ratchet wheel 159, and coacting with this ratchet wheel is a pawl 160 carried upon the cam wheel. The cam wheel is provided with teeth which are adapted to engage with a knotting head and suitable twine cutting devices as usually found in knotters of this character. The shaft 158 is actuated by means of a gear wheel 163 mounted upon the end of the shaft and coacting with an arcuate rack 164 which is mounted upon the frame of the machine. This rack extends downward and rearward and has its inner face toothed so as to engage with the gear wheel 163. It will now be obvious that as the shock former rotates from its horizontal to its vertical position the shaft 158 will be driven by the intermeshing of the gear wheel 163 with the arcuate rack 164 and through the action of the pawl will give motion to the cam wheel and to the knot tying and cutting devices. Upon a reverse motion of the shock former shifting from its vertical to its horizontal position the shaft 158 will rotate without action upon the knotting mechanism.

As before stated, as soon as the shock former commences to rotate, the needle arm is released and drops to the dotted line position in Fig. 8, and the eye of the needle crosses the inlet of the shock former and is engaged in the knotter head. We will assume that the shock former is now swung to a half-way position at an angle of about 45 degrees. It still swings downward and at this point the shaft 158 is caused to revolve, which gives motion to the cam wheel on the shaft and the cam wheel in turn gives motion to the crank shaft and to the cam shaft. The needle holds the twine across the clamp and at the same time the knot is tied and the knife cuts off the twine. The knot is pulled off the inner fingers at this movement and the shock is tied and in an upright position to be deposited upon the ground. The shock former is now coming to a stop in its vertical position, and while at the same time the hooks 49 are engaging the cam rollers 72 and 73 and the gates 48 are opened and the shock drops out on the ground to a standing position and the machine passes on. After the machine has passed beyond the shock the second trip rope 102 is pulled, which, through the mechanism before stated, operatively engages the drum 87 with the shaft 84 and the shock former is rotated to its horizontal position, the gates being closed by the engagement of the fingers 49 with the arcuate bar 68. When the shock former has reached its horizontal position the mechanism heretofore described disconnects the drum 87 from the shaft 84 and at the same time the trip fingers or tongues 128 are released so that they may again cause the operation of the packer arms 110 as each sheet or bundle is deposited upon the trip tongues or arms 128.

It will be seen that with the mechanism heretofore described, the operation is generally as follows: The bundles are fed from the binder one by one onto the binder trips 128 and as each bundle strikes the trip it causes the operative engagement of the packer arms with the driving shaft and causes the packer arms to oscillate, carrying the bundles into the binder. The first bundle into the binder forces the twine *a* inward and the bundle is supported upon the finger 80. The next bundle is also supported upon this finger and by the twine. The bundles are deposited one after another in the former until the former is filled with bundles. The trip rope 97 is then pulled which releases the support for the forward heavier end of the shock former and the forward end by gravity rotates to its vertical position. As it rotates, the shield 52 and the needle arm are released so that the needle arm falls and the shield 52 compresses the bundles into a shock. The knot tying mechanism commences to work and the knot is tied while the former is moving to its vertical position. When it reaches its vertical position the doors or gates 148 are opened and the shock allowed to pass out. The trip rope 102 is then pulled to cause the drum 87 to wind up upon the cable 88 and cause the shock former to return to its vertical position. During the period while the shock former is moving from its horizontal to its vertical position the binder trips or fingers 128 are operatively disconnected from engagement with the clutch members 123 and 126 so that no movement can be communicated to the packer arms and thus no bundles can be carried up the apron or chute 74 until the shock former returns to its horizontal receiving position. As the shock former returns to its horizontal receiving position the arm 53 is raised, lifting the shield 52 and opening the shock former ready to receive the bundles to form another shock.

It will be seen that the shocker which I have above described is practically automatic in its action and that the work is done to a large extent by gravity, the only action not automatic being that required to cause the operation of the packers and that required to turn the shocker back to its receiving position after it has set up the shock.

In the practical operation of the device, the bundle coming from the binder trips the packer arms which operate the mechanism for carrying the bundle into the shock former. This bundle when it enters presses back the twine which is stretched across the opening of the shock former, and this twine holds up the bundle and prevents it falling to the bottom of the shock former, the butt end of the bundle being kept level by the finger which is mounted on the inside of the shock former, the finger being held in place by a spring of a tension equal to the tension of the twine so that it yields correspondingly with the twine.

The action above described is repeated until the shock former is full. The operator then actuates the trip which permits the shock former to rotate to its vertical position and shortly after the shock former has started to rotate the needle is released and the needle and shock drop with the weight of about 35 pounds, thus compressing the shock. The shock is held compressed by a spring while the shock is being tied and the rotation of the former to its discharge position causes the knotting of the twine and the cutting of the twine. As the shock former nears its vertical position, the needle arm is drawn outward releasing the shock and at the same time the gates which normally form the bottom of the former open, releasing the shock, and the shock drops perpendicularly to the ground to a distance of about 14 inches. When the shock has passed out of the former, the operator trips the cable drum into action and the former is turned back to a receiving position by the power of the traction wheel and everything is set for another shock. The mechanism is relatively simple, positive in its action, and relatively compact.

Having described my invention, what I claim is:

1. A grain shocker including a supporting frame, a shock former pivotally mounted upon the frame and movable from a horizontal receiving position to a vertical discharging position, said former including oppositely disposed side walls, a gate forming the bottom of the former when the former is in its horizontal position and the rear wall of the former when it is in its vertical position, an arm pivotally mounted upon one of said side walls and supporting a shock compressing member in a position opposite the gate, means for causing the raising of said arm and compressing member when the shock former is in its horizontal position and causing the depression of the arm and member when the shock former starts to rotate to its vertical position, and means for again opening the arm and compressing member while the shock former is rotating to its vertical position and holding it open while it is rotating to its horizontal position.

2. A grain shocker including a supporting frame, a shock former pivotally mounted upon the frame for rotation from a horizontal receiving position to a vertical discharging position, gates forming the bottom of said shock former, rock shafts pivotally supporting said gates, each having an outwardly projecting curved arm, arcuate members concentric to the rotating axis of the former with which the extremities of said arms are adapted to engage to hold the gates in a closed position when the shock former is in a horizontal position and while it is rotating from a horizontal to a vertical position, and cams disposed on the extremities of said arcuate members engaging said arms to cause the opening of the gates when the former has reached its vertical position and cause the closing of the gates as the former starts to move from a vertical position to its horizontal position.

3. A grain shocker including a supporting frame, a shock former pivotally mounted upon the frame for rotation from a horizontal receiving position to a vertical discharging position, a needle bar pivotally mounted upon one wall of the shock former, a knotting mechanism mounted upon the other wall of the former, and means for causing the oscillation of the needle bar as the former operates from a vertical to a horizontal position, comprising a spring normally urging the needle bar inward, a latch normally holding the needle bar from actuation by the spring, means for releasing said latch as the shock former rotates from its horizontal position, and a cam operatively engaging the needle bar to return it to its initial position as the shock former continues its movement to a vertical position.

4. A grain shocker including a supporting frame, a shock former pivotally mounted upon the frame and including oppositely disposed side walls, a needle bar pivotally mounted upon one of said side walls, a knotting mechanism coacting with the needle bar and supported upon the other said wall, means normally urging the needle bar into engagement with the knotter a latch normally holding the needle bar away from its engagement with the knotter and in an open position and against the action of said means, means for releasing said latch as the shock former moves from a horizontal to a vertical position to thereby cause the movement of the needle bar into operative engagement with the knotter, and means engaging the needle bar as the shock former continues to rotate to its vertical position to cause the oscillation of the needle bar away from the knotting mechanism, said means causing the operative engagement of the needle bar with the latch.

5. A grain shocker including a supporting frame, a shock former pivotally mounted upon the frame for movement from a horizontal receiving position to a vertical position and vice versa, means for causing said movement of the shock former a needle bar mounted upon one wall of the shock former, a knotting mechanism mounted upon the opposite wall of the shock former and coacting with the extremity of the needle bar, a spring normally urging the needle bar into its closed position and into coaction with the knotter, a latch holding the needle bar in open position and with its extremity spaced from the knotter and against the tension of said spring, means for causing the disengagement of the latch from its operative engagement with the needle bar when the shock former starts to rotate from its vertical to its horizontal position to thereby permit the engagement of the free end of the needle bar with the knotting mechanism, and means then acting to shift the needle bar outward to disengage its free end from the knotter while the shock former is moving to its vertical position, said means then causing the operative engagement of the latch with the needle bar to hold the needle bar in its open position while the shock former is returning to its horizontal position.

6. A grain shocker including a supporting frame, a shock former pivotally mounted upon the frame, said shock former having oppositely disposed side walls, and a gate forming the bottom of the shock former when the latter is in its horizontal position and the rear wall of the shock former when the latter is in its vertical position, a needle bar pivotally mounted upon one wall of the shock former and having a downwardly extending arm, a knotter mounted upon the opposite wall of the shock former, means normally urging the needle bar inward to carry its free end into engagement with the knotter, a latch engaging the outwardly projecting arm of the needle bar and holding the needle bar in an open position when the shock former is in a horizontal position, means normally holding the gate in its closed position when the shock former is in its horizontal position and while the former is rotating to a vertical position, means acting to release the latch to permit the closing of the needle arm when the shock former starts to rotate from its horizontal to its vertical position, means then acting to shift said arm outward while the shock former is rotating to its vertical position and again operatively engage the latch with said arm, and means acting to open said gate when the shock former has reached its vertical position and close the gate as the shock former starts to move back to its horizontal position.

7. A grain shocker including a supporting frame, a shock former pivotally mounted upon the frame, and including oppositely disposed walls and a gate forming a bottom of the shock former when the latter is in its horizontal position and the rear wall of the shock former when the latter is in its vertical position, means for retaining said gate in a closed position while the shock former is in its horizontal position and while it is rotating to a vertical position, means then acting to open said gate to permit of the discharge of the shock, a needle arm pivotally mounted upon one wall of the former and having an outwardly projecting extension, a knotter mounted upon the other wall of the former and with which the needle arm coacts, a spring normally urging the needle arm to a closed position, a detent formed upon the extension of the arm, a pivotally mounted latch carried upon the wall of the former and adapted to engage said detent when the arm is in its raised position, means for causing the release of said latch when the shock former begins to rotate from its horizontal position to thereby permit the needle arm to close, and an arcuate cam with which the extremity of the extension is adapted to engage as the shock former rotates from its horizontal to its vertical position acting to raise the free end of the needle arm and shift the needle arm to such position that the latch will again engage the detent to hold the needle arm in its raised position while the shock former is rotating from its vertical to its horizontal position.

8. A grain shocker including a supporting frame, a shock former pivotally mounted upon the frame, a shock compressing member forming one of the walls of the shock former and yieldingly urged toward the body of the former, a latch holding the compressing member in a raised position when the former is in a horizontal position, means for releasing said latch when the former starts to move from a horizontal receiving position to a vertical discharging position, and means for again raising said compressing member and engaging it with said latch when the former reaches its vertical position.

9. A grain shocker including a supporting frame, a shock former pivotally mounted upon the frame for rotation from a horizontal receiving position to a vertical discharging position, a compressing member pivotally mounted upon one wall of the shock former, and means for causing an oscillation of the compressing member toward and from the body of the former as the former rotates from a vertical to a horizontal position comprising a spring normally urging the compressing member inward, a latch normally holding the compressing member from actuation by the spring, means for releasing said latch as the shock former rotates from its horizontal position, and means operatively engaging the compressing member to return it to its longitudinal position as the shock former continues its movement to a vertical position.

10. A grain shocker including a supporting frame, a shock former pivotally mounted upon the frame and including oppositely disposed side walls, a compressing member pivotally mounted upon one of said side walls, means normally urging the compressing member inward toward the body of the shock former, a latch normally holding the compressing member away from its engagement with the shock former and in an open position and against the action of said means, means for releasing said latch as the shock former moves from a horizontal to a vertical position to thereby cause the inward movement of the compressing member, and means engaging the compressing member as the shock former continues to rotate to its vertical position to cause the oscillation of the compressing member away from the body of the shock former, said means causing the operative engagement of the compressing member with said latch.

11. A grain shocker including a supporting frame, a shock former pivotally mounted upon the frame for movement from a horizontal receiving position to a vertical discharging position and vice versa, means for causing said movement of the shock former, a shock compressing member hingedly mounted upon one wall of the shock former, a spring normally urging the compressing member into a closed position toward the body of the shock former, a latch holding the compressing member in an open position and with its free edge spaced from the corresponding wall of the shock former and against the tension of said spring, means for causing the disengagement of the latch from its operative engagement with the compressing member when the shock former starts to rotate from its vertical to its horizontal position to thereby permit the movement of the free edge of the compressing member toward the corresponding wall of the former, and means then acting to shift the compressing member outward to move its free edge away from the corresponding wall of the shock former while the shock former is moving to its vertical position, said means then causing the operative engagement of the latch with the compressing member to hold the compressing member in its open position while the shock former is returning to its horizontal position.

12. A grain shocker of the character described including a shock former rotatable from a receiving position to a discharging position under the action of gravity, means normally holding the shock former in its horizontal receiving position, trip operated means for releasing said holding means to permit the former to swing to a vertical position, a power operated shaft, a winding drum having a flexible connection extending from the drum to the free end of the shock former, and means for operatively connecting said winding drum to said shaft to thereby cause the actuation of the drum and the retraction of the former to its longitudinal position.

13. A grain shocker of the character described including a shock former rotatable from a receiving position to a discharging position under the action of gravity, means normally holding the shock former in its horizontal receiving position, trip operated means for releasing said holding means to permit the former to swing to a vertical position, a power operated shaft, a winding drum having a flexible connection extending from the drum to the free end of the shock former, means for operatively connecting said winding drum to said shaft to thereby cause the actuation of the drum and the retraction of the former to its longitudinal position, and means for preventing the further winding movement of the drum when the shock former has returned to its original position.

In testimony whereof I hereunto affix my signature in the presence of two witnesses.

FALTINE NEWBAUER.

Witnesses:
E. B. STULL,.
JAS. W. STULL.

Copies of this patent may be obtained for five cents each, by addressing the "Commissioner of Patents, Washington, D. C."